United States Patent
Sarkar et al.

(10) Patent No.: US 8,279,799 B1
(45) Date of Patent: Oct. 2, 2012

(54) INTELLIGENT TRANSMISSION OF WIRELESS COMMUNICATION OVERHEAD MESSAGES

(75) Inventors: Debasish Sarkar, Irvine, CA (US);
Manoj Shetty, Overland Park, KS (US);
Sachin R. Vargantwar, Overland Park, KS (US); Siddharth S. Oroskar, Overland Park, KS (US); Deveshkumar Narendrapratap Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 838 days.

(21) Appl. No.: 12/253,312

(22) Filed: Oct. 17, 2008

(51) Int. Cl.
*H04W 4/00* (2009.01)
(52) U.S. Cl. .................. 370/328; 370/329; 455/466
(58) Field of Classification Search .................. 370/328, 370/329, 349, 468–477; 709/247, 246, 245
See application file for complete search history.

(56) References Cited

U.S. PATENT DOCUMENTS

| | | | |
|---|---|---|---|
| 2004/0160914 A1* | 8/2004 | Sarkar | 370/329 |
| 2005/0007973 A1 | 1/2005 | Jang et al. | |
| 2005/0250520 A1* | 11/2005 | Johnson et al. | 455/466 |
| 2006/0030373 A1 | 2/2006 | Park | |
| 2007/0153719 A1* | 7/2007 | Gopal | 370/328 |
| 2008/0205327 A1 | 8/2008 | Tu | |

* cited by examiner

*Primary Examiner* — Ian N Moore
*Assistant Examiner* — Kiet Tang (57) ABSTRACT

What is disclosed is a method of operating a wireless communication system. The method includes wirelessly transferring overhead information to a wireless communication device using a first overhead message type that is repeatedly transferred during repeating overhead time periods. The method also includes obtaining new overhead information for the wireless communication device, where if the new overhead information will fit within the first overhead message type during a subsequent one of the repeating overhead time periods, wirelessly transferring the new overhead information to the wireless communication device using the first overhead message type in the subsequent one of the repeating overhead time periods, and if the new overhead information will not fit within the first overhead message type during the subsequent one of the repeating overhead time periods, wirelessly transferring a notice for a second overhead message type to the wireless communication device using the first overhead message type in the subsequent one of the repeating overhead time periods, and wirelessly transferring the new overhead information to the wireless communication device using the second overhead message type.

18 Claims, 5 Drawing Sheets

INTELLIGENT TRANSMISSION OF WIRELESS COMMUNICATION OVERHEAD MESSAGES

TECHNICAL FIELD

Aspects of the disclosure are related to the field of communications, and in particular, wireless communication protocols of wireless communication networks.

TECHNICAL BACKGROUND

Wireless communication networks typically include wireless communication devices which, via a wireless communication system, communicate with further communication networks and equipment. The wireless communication system typically includes access nodes and associated equipment to route user communications over wireless links from the wireless communication devices to further communication networks, equipment, and destinations.

In addition to user communications, the wireless communication devices are typically configured to receive overhead information via overhead messaging cycles carried over control channels in the wireless links. The overhead information is typically transferred in several overhead message types which carry designated overhead information. However, when many wireless communication devices are communicating with an access node, the messages can consume limited resources of the wireless links, and performance of communications transferred to and from the wireless communication devices can suffer. Moreover, when using the various overhead message types, overhead information may consume a larger portion of the available resources than necessary to transfer the overhead information.

OVERVIEW

What is disclosed is a method of operating a wireless communication system. The method includes wirelessly transferring overhead information to a wireless communication device using a first overhead message type that is repeatedly transferred during repeating overhead time periods. The method also includes obtaining new overhead information for the wireless communication device, where if the new overhead information will fit within the first overhead message type during a subsequent one of the repeating overhead time periods, wirelessly transferring the new overhead information to the wireless communication device using the first overhead message type in the subsequent one of the repeating overhead time periods, and if the new overhead information will not fit within the first overhead message type during the subsequent one of the repeating overhead time periods, wirelessly transferring a notice for a second overhead message type to the wireless communication device using the first overhead message type in the subsequent one of the repeating overhead time periods, and wirelessly transferring the new overhead information to the wireless communication device using the second overhead message type.

What is also disclosed is a method of operating a wireless communication system. The method includes wirelessly transferring overhead information to a wireless communication device using a first overhead message type that is repeatedly transferred during repeating overhead time periods. The method also includes obtaining new overhead information for the wireless communication device and monitoring loading of the repeating overhead time periods. The method also includes, if the loading of the repeating overhead time periods does not exceed a threshold, wirelessly transferring the new overhead information to the wireless communication device using the first overhead message type in the subsequent one of the repeating overhead time periods, and if the loading of the repeating overhead time periods exceeds the threshold, wirelessly transferring a notice for a second overhead message type to the wireless communication device using the first overhead message type in the subsequent one of the repeating overhead time periods, and wirelessly transferring the new overhead information to the wireless communication device using the second overhead message type.

What is also disclosed is a wireless communication system. The wireless communication system includes an access node configured to wirelessly transfer overhead information to a wireless communication device using a first overhead message type that is repeatedly transferred during repeating overhead time periods. The wireless communication system also includes a control node configured to obtain new overhead information for the wireless communication device. If the new overhead information will fit within the first overhead message type during a subsequent one of the repeating overhead time periods, the access node is configured to wirelessly transfer the new overhead information to the wireless communication device using the first overhead message type in the subsequent one of the repeating overhead time periods. If the new overhead information will not fit within the first overhead message type during the subsequent one of the repeating overhead time periods, the access node is configured to wirelessly transfer a notice for a second overhead message type to the wireless communication device using the first overhead message type in the subsequent one of the repeating overhead time periods, and wirelessly transfer the new overhead information to the wireless communication device using the second overhead message type.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
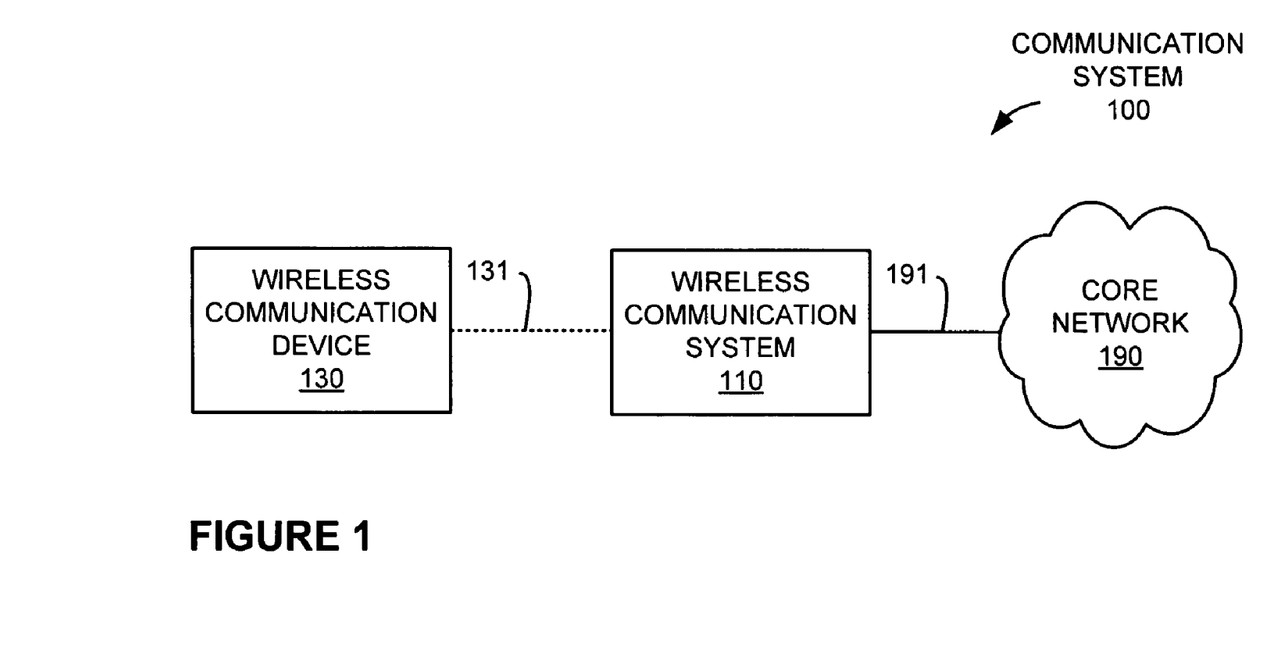
FIG. 1 is a system diagram illustrating a communication system.

FIG. 1 is a system diagram illustrating communication system 100. Communication system 100 includes wireless communication device 130, wireless communication system 110, and core network 190. Wireless communication device 130 and wireless communication system 110 communicate over wireless link 131. Core network 190 and wireless communication system 110 communicate over link 191.

Wireless communication device 130 comprises a telephone, transceiver, computer, digital assistant, smart phone, Internet appliance, or some other wireless communication apparatus—including combinations thereof. Although communication system 100, as shown in FIG. 1, includes one wireless communication device, it should be understood that in other examples, more wireless communication devices could be in communication with wireless communication system 110.

Wireless communication system 110 includes wireless communications network equipment capable of communicating with wireless communication device 130. Examples of wireless communication system 110 can include base stations, base transceiver stations, boomer stations, antennas, radio node controllers (RNC), mobile switching centers, call processing equipment, wireless access nodes, wireless access points, telephone switches, Internet routers, network gateways, as well as other type of communication equipment—including combinations thereof.

Core network 190 could include an Internet network, wireless network, telephony network, optical network, enterprise network, local area network, packet data serving node (PDSN), or some other type of communication network or communication equipment—including combinations thereof.

Wireless link 131 uses various communication media, such as air, space, or some other wireless transport media—including combinations thereof. Wireless link 131 could use protocols such as code division multiple access (CDMA), evolution-data optimized (EV-DO), worldwide interoperability for microwave access (WiMAX), long-term evolution (LTE), wireless fidelity (WiFi), global system for mobile communications (GSM), universal mobile telecommunications system (UMTS), or some other communication format—including combinations, variations, or improvements thereof.

Wireless link 131 may comprise many different signals sharing the same link. Wireless link 131 could include multiple signals operating in a single "airpath"—as represented by the dashed line in FIG. 1—comprising multiple frequencies, timeslots, time cycles, channels, directional links, transportation ports, logical transportation links, network sockets, packets, or communication directions. For example, communications and control signals between wireless communication device 130 and wireless communication system 110 could share the same wireless link 131, but be transferred over different frequencies, timeslots, time cycles, channels, directional links, transportation ports, logical transportation links, network sockets, packets, or in different directions—including combinations thereof.

Link 191 uses various communication media, such as air, space, metal, optical fiber, or some other signal propagation path—including combinations thereof. Link 191 could be wired or wireless and could use communication protocols such as Internet, Internet protocol (IP), local-area network (LAN), optical networking, hybrid fiber coax (HFC), telephony, T1, or some other communication format—including combinations, improvements, or variations thereof. Link 191 could be a direct link or might include various equipment, intermediate components, systems, and networks. Link 191 could include multiple signals operating in a single pathway in a similar manner as wireless link 131.

Figure 2:
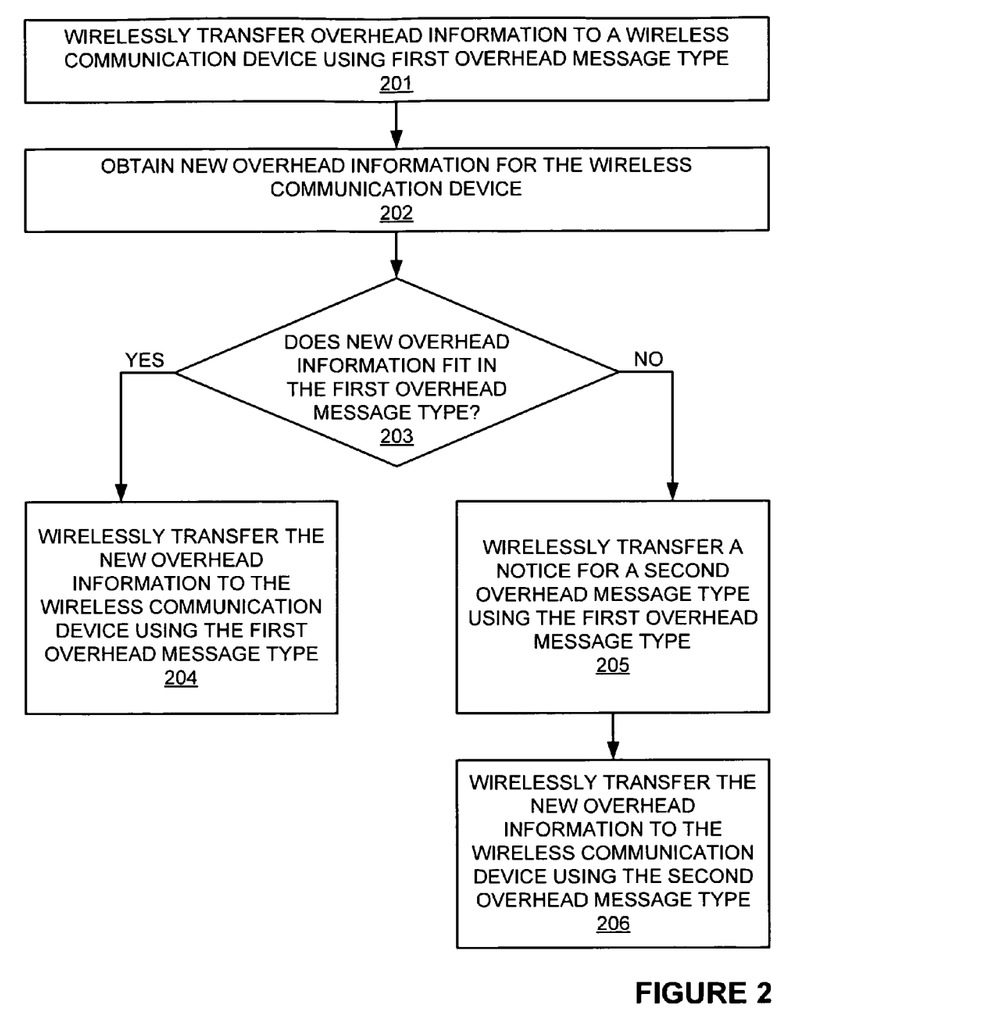
FIG. 2 is a flow diagram illustrating a method of operation of a communication system.

FIG. 2 is a flow diagram that illustrates a method of operation of communication system 100, as found in FIG. 1. The phases shown in FIG. 2 are indicated herein parenthetically. In FIG. 2, wireless communication system 110 wirelessly transfers (201) overhead information to wireless communication device 130 using a first overhead message type.

In a typical example of communication system 100, in addition to user communications, wireless communication system 110 is configured to exchange overhead information with wireless communication device 130 throughout the communication services, user communications, sessions, or time of access by wireless communication device 130. In some examples, this overhead information is exchanged in individual overhead messaging time slots of a series of repeating overhead time periods, where each overhead time period includes many overhead messaging time slots. In many examples, the repeating overhead time periods are a part of an overhead communication channel between wireless communication system 110 and wireless communication device 130. This overhead communication channel could further be a part of wireless link 131, which could include many different communication channels, such as forward links and reverse links, between wireless communication system 110 and wireless communication device 130. In an example EV-DO protocol, the repeating overhead time periods could be control cycles of a control channel of the EV-DO forward link from wireless communication system 110 to wireless communication device 130.

The first overhead message type is of a type of overhead message that is repeatedly transferred during repeating overhead time periods. In many examples, the first overhead message type contains overhead information that is monitored by all wireless communication devices in communication with wireless communication system 110. This overhead information could include information relating to certain parameters of wireless link 131, among other parameters including a color code, sector identifier, sector and access signatures, a validity of MAC indices, or other information, including combinations thereof. In some examples, the first overhead message type is a quick configuration message of a CDMA or EV-DO wireless protocol. Further examples of the overhead communication are discussed below and illustrated in FIG. 5.

Wireless communication system 110 obtains (202) new overhead information for wireless communication device 130. This new overhead information could include generally applicable information similar to that described in above examples of the quick configuration message, or could include information specific to a particular wireless communication device. Examples of new overhead information include access parameter messages (APM), sector parameter messages (SPM), paging information, text message information, call processing information, among other information.

Wireless communication system 110 determines (203) if the new overhead information will fit in the first overhead message type. For example, the first overhead message type could have limited space to contain overhead information. Additionally, in some examples, the first overhead message type is monitored by all wireless communication devices in communication with wireless communication system 110. Therefore, overhead information relating to all wireless communication devices may require a larger amount of the space resources of the first overhead message type, limiting the available space resources for overhead information directed to a specific wireless communication device.

If the new overhead information will fit within the first overhead message type, wireless communication system 110 wirelessly transfers (204) the new overhead information to wireless communication device 130 using the first overhead message type. Since overhead information had originally been transferred in phase (201) above, the new overhead information would be transferred in a subsequent one of the repeating time periods using the first overhead message type.

If the new overhead information will not fit within the first overhead message type, wireless communication system 110 wirelessly transfers (205) a notice for the second overhead message type to wireless communication device 130 using the first overhead message type in a subsequent one of the repeating overhead time periods. In some examples, this notice for the second overhead message type could include an indicator in the first overhead message type to inform wireless communication device 130 to expect a second overhead message type. Then, wireless communication system 110 wirelessly transfers (206) the new overhead information to the wireless communication device using the second overhead message type.

Advantageously, instead of always sending an overhead message of the second message type to wireless communication device 130, the overhead information could be sent in the first overhead message type. This potentially frees up the resources of wireless link 131 normally used for the second message type, and allows for other wireless communication devices or other overhead information to utilize the resources used to transfer the second overhead message types.

In further examples of communication system 100, user communications between wireless communication device 110 and core network 190, or further systems, could be exchanged through wireless communication system 110.

Also, in further examples of communication system 100, wireless communication system 110 could wirelessly transfer the new overhead information to wireless communication device 130 using the second overhead message type at a first rate during the repeating overhead time periods. Such examples could also include monitoring loading of the repeating overhead time periods, and if the loading of the repeating overhead time periods exceeds a threshold, wireless communication system 110 could wirelessly transfer the overhead information to wireless communication device 130 using the second overhead message type at a second rate during the repeating overhead time periods, where the second rate during is lower than the first rate. In some examples, wireless communication system 110 could wirelessly transfer a rate notice of the second rate to wireless communication device 130 using the first overhead message type in the subsequent one of the repeating overhead time periods.

Figure 3:
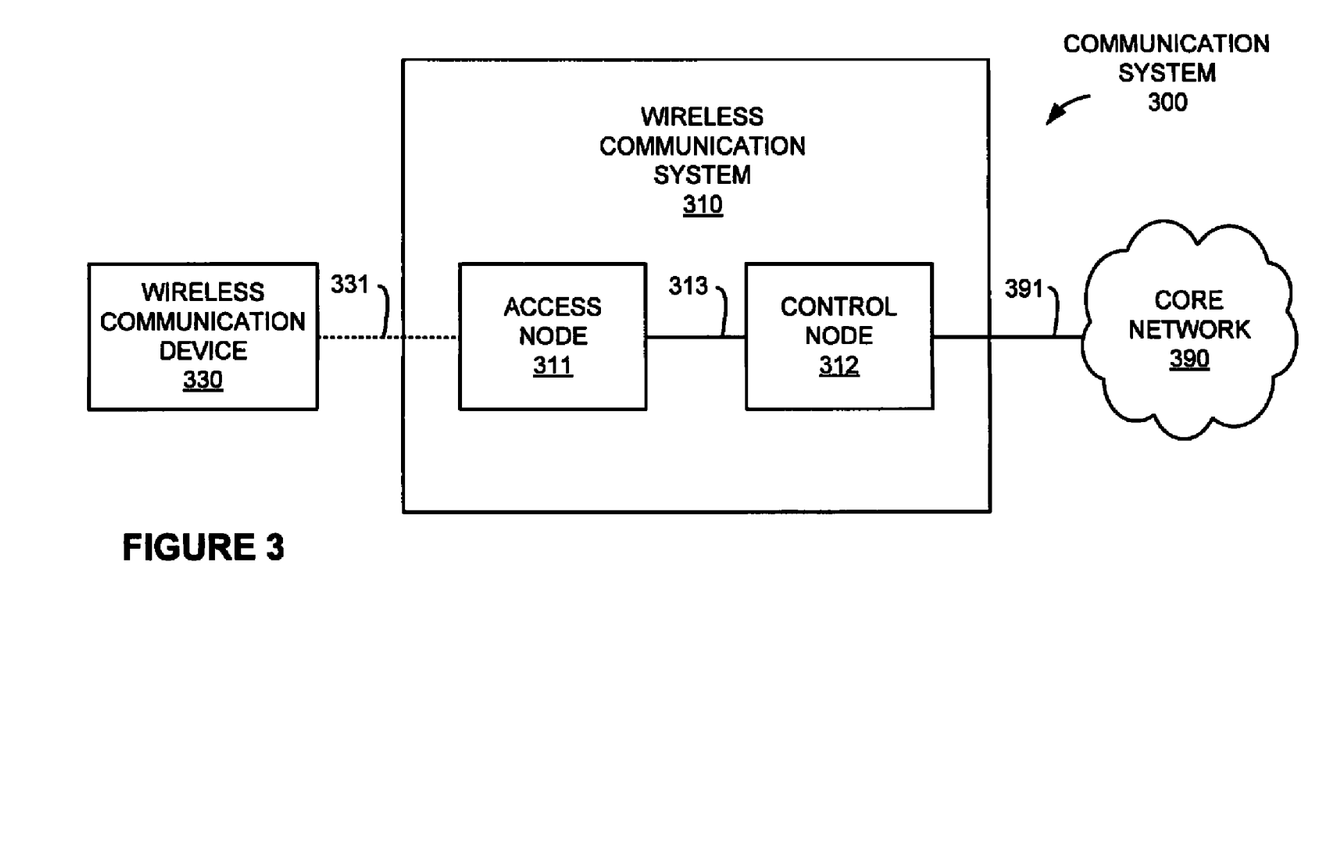
FIG. 3 is a system diagram illustrating a communication system.

FIG. 3 is a system diagram illustrating communication system 300. Communication system 300 includes wireless communication device 330, wireless communication system 310, and core network 390. Wireless communication device 330 and wireless communication system 310 communicate over wireless link 331. Core network 390 and wireless communication system 310 communicate over link 391.

Wireless communication device 330 comprises smart phone in this example. Although communication system 300, as shown in FIG. 3, includes one wireless communication device, it should be understood that in other examples, more wireless communication devices could be in communication with wireless communication system 310.

Wireless communication system 310 includes access node 311 and control node 312, which communicate over link 313. In some examples, the functionality of wireless communication system 310, as found in access node 311 and control node 312, is included in the same equipment or systems, while in other examples, the functionality is included in separate equipment or systems.

Access node 311 includes communications equipment capable of communicating with wireless communication device 330. Examples of access node 311 can include antennas, base stations, base transceiver stations, boomer stations, call processing equipment, wireless access points, telephone switches, Internet routers, network gateways, as well as other type of communication equipment, including combinations thereof.

Control node 312 includes equipment for controlling and processing the overhead information exchanged with wireless communication device 330, for example, base station controllers, access node controllers, radio node controllers (RNC), or mobile switching controllers (MSC). Control node 312 could incorporate a computer microprocessor, circuitry, or some other processing device or software system, and may be distributed among multiple processing devices. In some examples, control node 312 is located within the same equipment as access node 311. Control node 312 may also include software such as an operating system, logs, utilities, drivers, networking software, and other software stored on a computer-readable medium.

In this example, access node 311 is operated by the same service provider as control node 312. Core network 390 includes a core network of the same service provider in this example, comprising an Internet network, local area networks, and other telecommunications equipment and networks. Link 313 comprises a T1 connection, and link 391 comprises an optical networking connection in this example. Wireless link 331 comprises a wireless link operating within the EV-DO protocol in this example, and could include features similar to wireless link 131.

Communication system 300 could also include other equipment and elements, for example, call processing systems, authentication, authorization and accounting (AAA) equipment, packet data serving nodes (PDSN), as well as other equipment—including combinations thereof.

Figure 4:
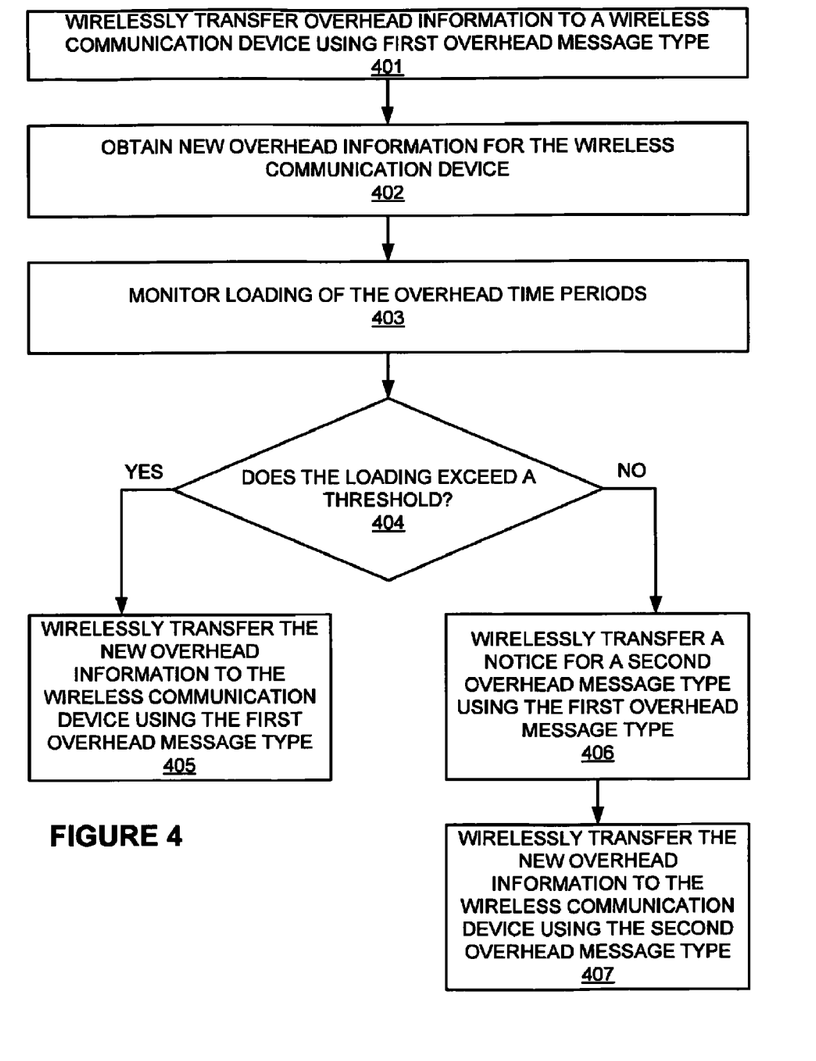
FIG. 4 is a flow diagram illustrating a method of operation of a communication system.

FIG. 4 is a flow diagram that illustrates a method of operation of communication system 300, as found in FIG. 3. The phases shown in FIG. 4 are indicated herein parenthetically. In FIG. 4, access node 311 in communication system 310 wirelessly transfers (401) overhead information to wireless communication device 330 using a first overhead message type.

In communication system 300, in addition to user communications, access node 311 in wireless communication system 310 is configured to exchange overhead information with wireless communication device 330. This overhead information is exchanged in overhead messaging time slots of a series of repeating overhead time periods, where each overhead time period includes many overhead messaging time slots. In this example, the repeating overhead time periods are control cycles which are a part of a control channel between access node 311 and wireless communication device 330. This control channel is a part of a forward link of wireless link 331. In this example, wireless communication device 330 is assigned to a designated one of the series of control cycles, and would monitor for overhead information transferred in the designated control cycle. Other wireless communication devices could also monitor a particular control cycle, but not necessarily the same control cycle as wireless communication device 330.

In communication system 300, the first overhead message type is a quick configuration message that is transferred during the control cycles of the EV-DO wireless protocol. This quick configuration message contains overhead information that is monitored by all wireless communication devices assigned to the particular control cycle. This overhead information could include information relating to certain parameters of wireless link 331, among other parameters including a color code, sector identifier, sector and access signatures, a validity of MAC indices, or other information, including combinations thereof.

Wireless communication system 310 obtains (402) new overhead information for wireless communication device 330. This new overhead information could include generally applicable information similar to that described in above example of the quick configuration message, or could include information specific to a particular wireless communication device. Examples of new overhead information could include call processing, paging or text message information, among other information. In other examples, the new overhead information includes information typically included in access parameter messages (APM) and sector parameter messages (SPM). These access parameter messages (APM) and sector parameter messages (SPM) are, in typical examples, transferred separately from the quick configuration messages, and consume additional portions of the available overhead messaging time slots of each control cycle.

Control node 312 monitors (403) loading of the overhead messaging time slots in the control cycles during the exchange of user communications. The loading could, for example, a indicate number of other wireless communication devices sharing each control cycle, an amount of overhead information being transferred in each control cycle, the information contained within access parameter messages (APM) or sector parameter messages (SPM), the amount of access parameter messages (APM) or sector parameter messages (SPM) transferred, or other information indicating a loading status of the overhead messaging time slots in the control cycles, among other information.

Control node 312 determines (404) if the loading exceeds a threshold. The threshold could be based on the number of overhead messaging time slots available for transferring overhead information in the particular control cycle that wireless communication device 331 is monitoring, among other factors.

If the loading exceeds the threshold, access node 311 wirelessly transfers (405) the new overhead information to wireless communication device 330 using the first overhead message type. Since overhead information had originally been transferred in phase (401) above, the new overhead information would be transferred in a subsequent one of the designated control cycles using the first overhead message type.

If the loading does not exceed the threshold, access node 311 wirelessly transfers (406) a notice for a second overhead message type to wireless communication device 330 using the first overhead message type in a subsequent one of the designated control cycles. In some examples, this notice for the second overhead message type could include an indicator in the first overhead message type to inform wireless communication device 330 to expect a second overhead message type. Then, access node 311 wirelessly transfers (407) the new overhead information to the wireless communication device using the second overhead message type. In this example, the second message type could comprise an access parameter message (APM) or sector parameter message (SPM), although in other examples different overhead messages could be used.

In some examples, even if the loading exceeds the threshold, access node 311 could wirelessly transfer the new overhead information to wireless communication device 330 using the second overhead message type if the new overhead information cannot fit into the first overhead message type, while if the new overhead information will fit within the first overhead message type during the subsequent one of the designated control cycles, access node 311 could wirelessly transfer the new overhead information to wireless communication device 330 using the first overhead message type in the subsequent one of the designated control cycles.

Advantageously, instead of always sending an overhead message of the second message type to wireless communication device 330, the overhead information could be sent in the first overhead message type when loading for the designated control cycle exceeds a threshold. This potentially frees up the overhead messaging resources of wireless link 331 normally used for the second message type, and allows for other wireless communication devices or other overhead information to utilize the resources used to transfer the second overhead message types, preventing further loading and overcrowding of the overhead messaging time slots.

In further examples of communication system 300, user communications between wireless communication device 310 and core network 390, or further systems, could be exchanged through wireless communication system 310.

Figure 5:
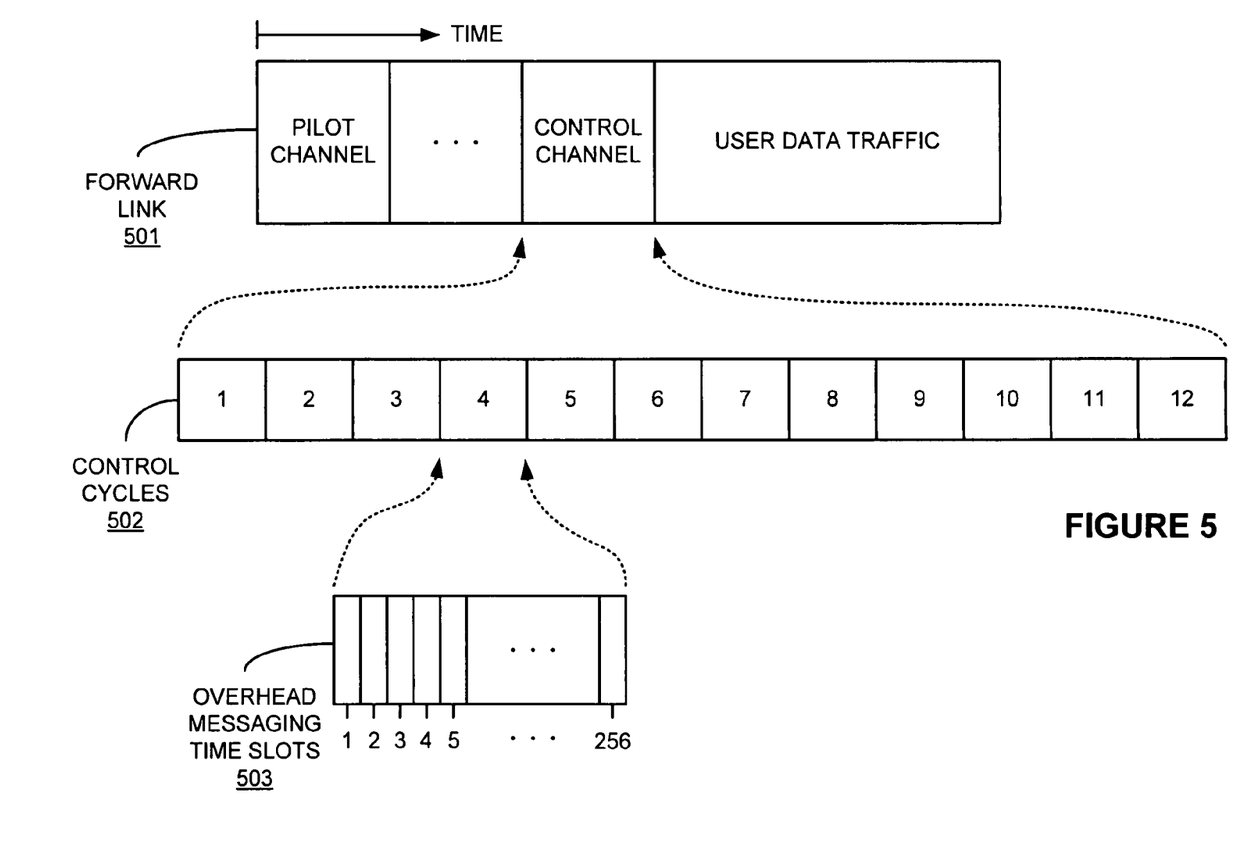
FIG. 5 is a diagram illustrating a forward link in a wireless communication system.

FIG. 5 is a diagram illustrating an example of a forward link in wireless link 331, as found in FIG. 3, although wireless link 331 could use other configurations. FIG. 5 illustrates forward link 501, control cycles 502, and overhead messaging time slots 503.

Forward link 501 includes several time-wise portions, with time increasing to the right, as shown by the arrowhead above forward link 501. In forward link 501, a pilot channel, control channel, and user data traffic portion are shown, although additional portions could also be in forward link 501. The forward link sequence is typically repeated continuously to effectuate communication service from access node 311 to wireless communication device 330 over wireless link 331. The forward link could also be processed with a spreading code before transfer to wireless communication device 330. In further examples, a reverse link of wireless link 331 could exist to facilitate communication services from wireless communication device 330 to access node 311. Other examples of forward link 501 could include frequency-wise portions, or other configurations, including combinations thereof.

The pilot channel includes information related to access node 311 or control node 312 and the service provider of communication system 300 used in the registration process of wireless communication device 330. The user data traffic portion includes user communications, such as voice call data, web pages, email, among other information. The control channel includes information related to overhead information of wireless link 331 and overhead information of the associated communication services. The control channel could comprise broadcast portions applicable to all wireless communication devices in communication with access node 311, and portions specific to wireless communication device 330 or other wireless communication devices.

In the example shown in FIG. 5, control cycles 502 includes 12 control cycles. Each of the control cycles are distinct, with possibly different content, in the control channel of forward link 501. Also, included in each control cycle 1-12 are overhead messaging time slots 503. In this example, 256 time slots are included in each control cycle 1-12. Each overhead messaging time slot 1-256 includes overhead information.

In some examples, the overhead information, such as the first overhead message type and the second overhead message type, as well as other information as described herein, could be found within the individual time slots of the control cycles. This overhead information could also include quick configuration messages, access parameters, sector parameters, paging information, call processing information, text message information, among other information.

Since, as described herein, wireless communication device 330 will only monitor a particular control cycle, only the time slots within the designated control cycle will be monitored by wireless communication device 330. Additionally, the individual time slots 1-256 for each control cycle 1-12 could also have information which allows wireless communication device 330 to determine if the time slot is relevant. In some cases, some time slots will be broadcast information applicable to many wireless communication devices, while in other cases, some time slots will be intended for a specific wireless communication device.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, the method comprising:
   wirelessly transferring overhead information to a wireless communication device using a first overhead message type that is repeatedly transferred during repeating overhead time periods;
   obtaining new overhead information for the wireless communication device;
   if the new overhead information will fit within the first overhead message type during a subsequent one of the repeating overhead time periods, wirelessly transferring the new overhead information to the wireless communication device using the first overhead message type in the subsequent one of the repeating overhead time periods;
   if the new overhead information will not fit within the first overhead message type during the subsequent one of the repeating overhead time periods, wirelessly transferring a notice for a second overhead message type to the wireless communication device using the first overhead message type in the subsequent one of the repeating overhead time periods, and wirelessly transferring the new overhead information to the wireless communication device using the second overhead message type at a first rate during the repeating overhead time periods;
   monitoring loading of the repeating overhead time periods;
   if the loading of the repeating overhead time periods exceeds a threshold, wirelessly transferring the overhead information to the wireless communication device using the second overhead message type at a second rate during the repeating overhead time periods, wherein the second rate during is lower than the first rate; and
   wirelessly transferring a rate notice of the second rate to the wireless communication device using the first overhead message type in the subsequent one of the repeating overhead time periods.

2. The method of operating the wireless communication system of claim 1, further comprising:
   if the loading of the repeating overhead time periods exceeds a threshold, wirelessly transferring the new overhead information to the wireless communication device using the first overhead message type in the subsequent one of the repeating overhead time periods.

3. The method of operating the wireless communication system of claim 1, further comprising:
   if the loading of the repeating overhead time periods exceeds a threshold and if the new overhead information will fit within the first overhead message type during the subsequent one of the repeating overhead time periods, wirelessly transferring the new overhead information to the wireless communication device using the first overhead message type in the subsequent one of the repeating overhead time periods; and
   if the loading of the repeating overhead time periods exceeds a threshold and if the new overhead information will not fit within the first overhead message type during the subsequent one of the repeating overhead time periods, wirelessly transferring the notice for the second overhead message type to the wireless communication device using the first overhead message type in the subsequent one of the repeating overhead time periods, and wirelessly transferring the new overhead information to the wireless communication device using the second overhead message type.

4. The method of operating the wireless communication system of claim 1, wherein the repeating overhead time periods are control cycles within a control channel of an evolution data optimized (EV-DO) forward wireless link.

5. The method of operating the wireless communication system of claim 1, wherein the first overhead message type is a quick configuration message of an evolution data optimized (EV-DO) control cycle.

6. The method of operating the wireless communication system of claim 1, wherein the second overhead message type is an access parameter message of an evolution data optimized (EV-DO) control cycle.

7. The method of operating the wireless communication system of claim 1, wherein the second overhead message type is a sector parameter message of an evolution data optimized (EV-DO) control cycle.

8. A method of operating a wireless communication system, the method comprising:
   wirelessly transferring overhead information to a wireless communication device using a first overhead message type that is repeatedly transferred during repeating overhead time periods;
   obtaining new overhead information for the wireless communication device;
   monitoring loading of the repeating overhead time periods;
   if the loading of the repeating overhead time periods does not exceed a threshold, wirelessly transferring the new overhead information to the wireless communication device using the first overhead message type in the subsequent one of the repeating overhead time periods; and
   if the loading of the repeating overhead time periods exceeds the threshold, wirelessly transferring a notice for a second overhead message type to the wireless communication device using the first overhead message type in the subsequent one of the repeating overhead time periods, wirelessly transferring the new overhead information to the wireless communication device using the second overhead message type at a first rate during the repeating overhead time periods, and wirelessly transferring the overhead information to the wireless communication device using the second overhead message type at a second rate during the repeating overhead time periods, wherein the second rate during is lower than the first rate; and
   wirelessly transferring a rate notice of the second rate to the wireless communication device using the first overhead message type in the subsequent one of the repeating overhead time periods.

9. The method of operating the wireless communication system of claim 8, wherein the repeating overhead time periods are control cycles within a control channel of an evolution data optimized (EV-DO) forward wireless link.

10. The method of operating the wireless communication system of claim 8, wherein the first overhead message type is a quick configuration message of an evolution data optimized (EV-DO) control cycle.

11. The method of operating the wireless communication system of claim 8, wherein the second overhead message type is an access parameter message of an evolution data optimized (EV-DO) control cycle.

12. The method of operating the wireless communication system of claim 8, wherein the second overhead message type is a sector parameter message of an evolution data optimized (EV-DO) control cycle.

13. A wireless communication system, comprising:
   an access node configured to wirelessly transfer overhead information to a wireless communication device using a first overhead message type that is repeatedly transferred during repeating overhead time periods;
   a control node configured to obtain new overhead information for the wireless communication device and monitor loading of the repeating overhead time periods;
   if the new overhead information will fit within the first overhead message type during a subsequent one of the repeating overhead time periods, the access node configured to wirelessly transfer the new overhead information to the wireless communication device using the first overhead message type in the subsequent one of the repeating overhead time periods;
   if the new overhead information will not fit within the first overhead message type during the subsequent one of the repeating overhead time periods, the access node configured to wirelessly transfer a notice for a second overhead message type to the wireless communication device using the first overhead message type in the subsequent one of the repeating overhead time periods, and wirelessly transfer the new overhead information to the wireless communication device using the second overhead message type repeatedly transferred at a first rate during the repeating overhead time periods;
   if the loading of the repeating overhead time periods exceeds a threshold, the access node configured to wirelessly transfer the overhead information to the wireless communication device using the second overhead message type at a second rate during the repeating overhead time periods, wherein the second rate during is lower than the first rate; and
   the access node configured to wirelessly transfer a rate notice of the second rate to the wireless communication device using the first overhead message type in the subsequent one of the repeating overhead time periods.

14. The wireless communication system of claim 13, further comprising:
   if the loading of the repeating overhead time periods exceeds a threshold and if the new overhead information will fit within the first overhead message type during the subsequent one of the repeating overhead time periods, the access node configured to wirelessly transfer the new overhead information to the wireless communication device using the first overhead message type in the subsequent one of the repeating overhead time periods.

15. The wireless communication system of claim 13, wherein the repeating overhead time periods are control cycles within a control channel of an evolution data optimized (EV-DO) forward wireless link.

16. The wireless communication system of claim 13, wherein the first overhead message type is a quick configuration message of an evolution data optimized (EV-DO) control cycle.

17. The wireless communication system of claim 13, wherein the second overhead message type is an access parameter message of an evolution data optimized (EV-DO) control cycle.

18. The wireless communication system of claim 13, wherein the second overhead message type is a sector parameter message of an evolution data optimized (EV-DO) control cycle.

* * * * *